United States Patent
Kuroki

(10) Patent No.: US 12,114,053 B2
(45) Date of Patent: Oct. 8, 2024

(54) IMAGING APPARATUS WITH BELT DRIVEN SIMULTANEOUS FILTER UNIT MOVEMENT

(71) Applicant: Panasonic Intellectual Property Management Co., Ltd., Osaka (JP)

(72) Inventor: Hiroyuki Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 97 days.

(21) Appl. No.: 17/979,124

(22) Filed: Nov. 2, 2022

(65) Prior Publication Data

US 2023/0232087 A1 Jul. 20, 2023

(30) Foreign Application Priority Data

Jan. 20, 2022 (JP) .................. 2022-007285

(51) Int. Cl.
*H04N 23/50* (2023.01)
*G02F 1/01* (2006.01)

(52) U.S. Cl.
CPC .......... *H04N 23/50* (2023.01); *G02F 1/0121* (2013.01)

(58) Field of Classification Search
CPC ...... H04N 23/50; H04N 23/55; G02F 1/0121; G03B 2205/00; G03B 17/12; G03B 11/00
See application file for complete search history.

(56) References Cited

U.S. PATENT DOCUMENTS

| | | | | |
|---|---|---|---|---|
| 2007/0248349 A1* | 10/2007 | Nanjo | ..................... | G03B 11/00 348/E5.04 |
| 2012/0249895 A1 | 10/2012 | Kaifu | | |
| 2015/0331164 A1* | 11/2015 | Sato | .................. | G03B 9/02 359/889 |
| 2020/0007786 A1* | 1/2020 | Ueda | ..................... | G06F 3/0485 |
| 2021/0141292 A1* | 5/2021 | Onaka | ................... | G03B 11/00 |
| 2021/0200059 A1* | 7/2021 | Iinuma | .................. | G02B 5/205 |
| 2021/0223665 A1* | 7/2021 | Kuroki | ................. | G03B 11/045 |
| 2021/0318508 A1* | 10/2021 | Sugaya | ................ | H04N 23/55 |

FOREIGN PATENT DOCUMENTS

| JP | 04-292144 A | 10/1992 |
|---|---|---|
| JP | 2003-241253 A | 8/2003 |
| JP | 2012-212078 A | 11/2012 |
| JP | 2018-013505 A | 1/2018 |

* cited by examiner

*Primary Examiner* — Padma Haliyur

(74) *Attorney, Agent, or Firm* — Renner, Otto, Boisselle & Sklar, LLP

(57) ABSTRACT

An imaging apparatus includes: an imaging element including an imaging surface; a first filter unit including a first optical filter; and a drive mechanism configured to move the first filter unit in parallel in a second direction intersecting a first direction being a normal direction of the imaging surface and between a first filtering position and a first retraction position. The first filtering position is a position at which the first optical filter is present in front of the imaging surface, and the first retraction position is a position at which the first optical filter is deviated from a front of the imaging surface. The drive mechanism includes a belt member coupled to the first filter unit, and a belt drive member configured to rotate in a state where the belt member is partially wound, the belt drive member configured to move a first portion of the belt member to which the first filter unit is coupled in the second direction.

7 Claims, 9 Drawing Sheets

IMAGING APPARATUS WITH BELT DRIVEN SIMULTANEOUS FILTER UNIT MOVEMENT

BACKGROUND OF THE INVENTION

Field of the Invention

The present disclosure relates to an imaging apparatus.

Description of the Related Art

For example, JP 2012-212078 A discloses an imaging apparatus including a dimming cell that changes light incident on an imaging element. The dimming cell is provided with, as an optical filter, a transmittance variable unit whose light transmittance changes by changing an applied voltage, and a transmittance fixed unit whose light transmittance is constant and specifically transparent. By moving the dimming cell in parallel in the parallel direction of the transmittance variable unit and the transmittance fixed unit, the transmittance variable unit or the transmittance fixed unit is selectively arranged in front of the imaging surface of the imaging element.

SUMMARY OF THE INVENTION

However, in the case of the imaging apparatus described in JP 2012-212078 A, respective retraction spaces for the transmittance variable unit and the transmittance fixed unit of the dimming cell are required on both sides of the imaging element as viewed in the normal direction of the imaging surface of the imaging element. As a result, the imaging apparatus increases in size.

Thus, an object of the present disclosure is to selectively arrange an optical filter in front of an imaging surface of an imaging element without increasing an imaging apparatus in size.

In order to solve the above problem, according to one aspect of the present disclosure, provided is an imaging apparatus including: an imaging element including an imaging surface on which light from a subject is incident; a first filter unit including a first optical filter; and a drive mechanism configured to move the first filter unit in parallel in a second direction intersecting a first direction being a normal direction of the imaging surface and between a first filtering position and a first retraction position. The first filtering position is a position at which the first optical filter is present in front of the imaging surface of the imaging element. The first retraction position is a position at which the first optical filter is deviated from a front of the imaging surface. The drive mechanism includes a belt member coupled to the first filter unit, and a belt drive member configured to rotate in a state where the belt member is partially wound, the belt drive member configured to move a first portion of the belt member to which the first filter unit is coupled in the second direction.

According to the present disclosure, the optical filter can be selectively disposed in front of the imaging surface of the imaging element without increasing the size of the imaging apparatus.

DESCRIPTION OF THE PREFERRED EMBODIMENTS

Hereinafter, embodiments will be described in detail with reference to the drawings as appropriate. However, a detailed description more than necessary may be omitted. For example, a detailed description of already well-known matters and a redundant description of substantially the same configuration may be omitted. This is to avoid the following description from becoming unnecessarily redundant and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims. Hereinafter, an imaging apparatus according to embodiments of the present disclosure will be described with reference to the drawings.

First Embodiment

Figure 1:
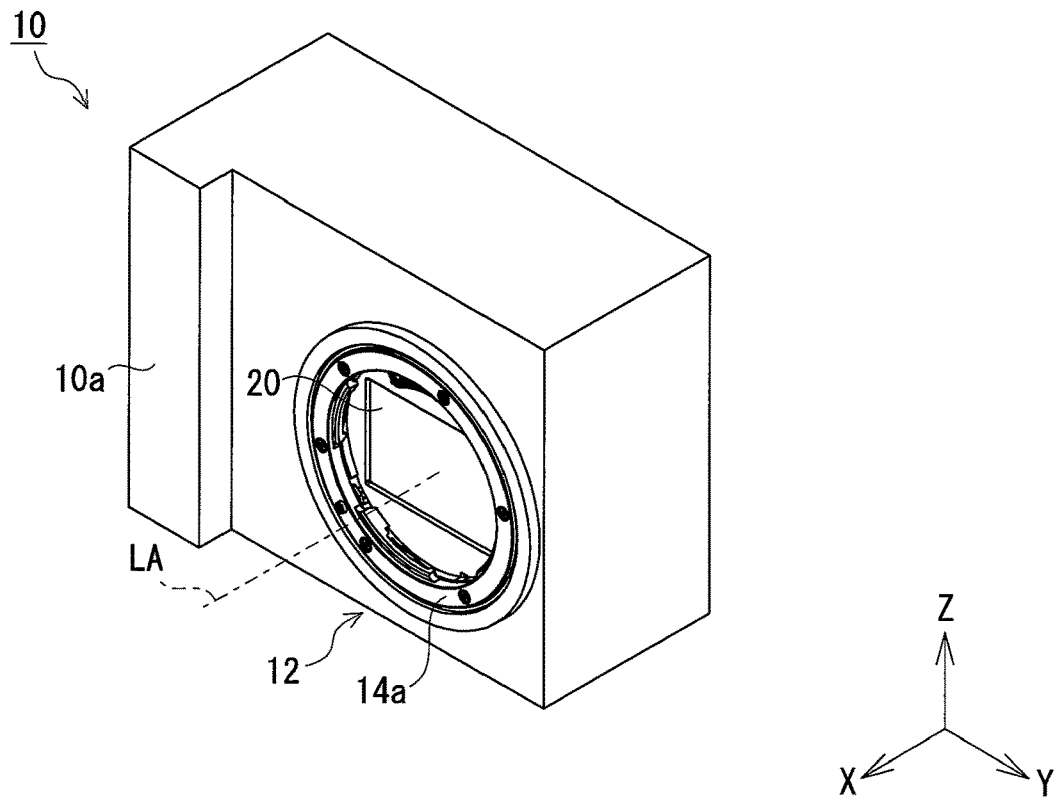
FIG. 1 is a schematic front perspective view of an imaging apparatus according to a first embodiment of the present disclosure.
Figure 2:
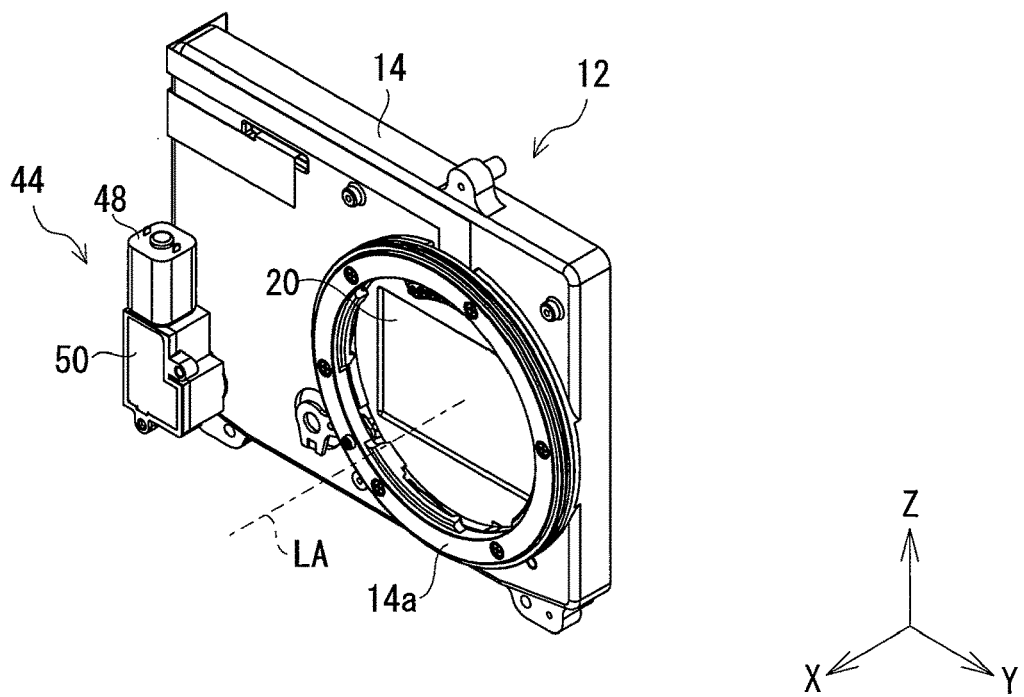
FIG. 2 is a front perspective view of a filter module of the imaging apparatus according to the first embodiment.
Figure 3:
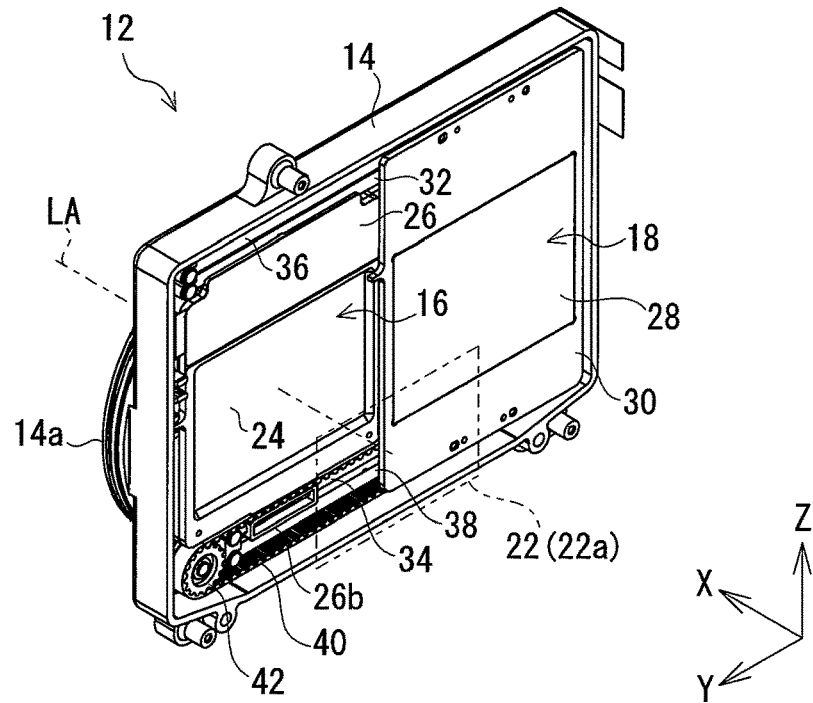
FIG. 3 is a rear perspective view of the filter module.
Figure 4:
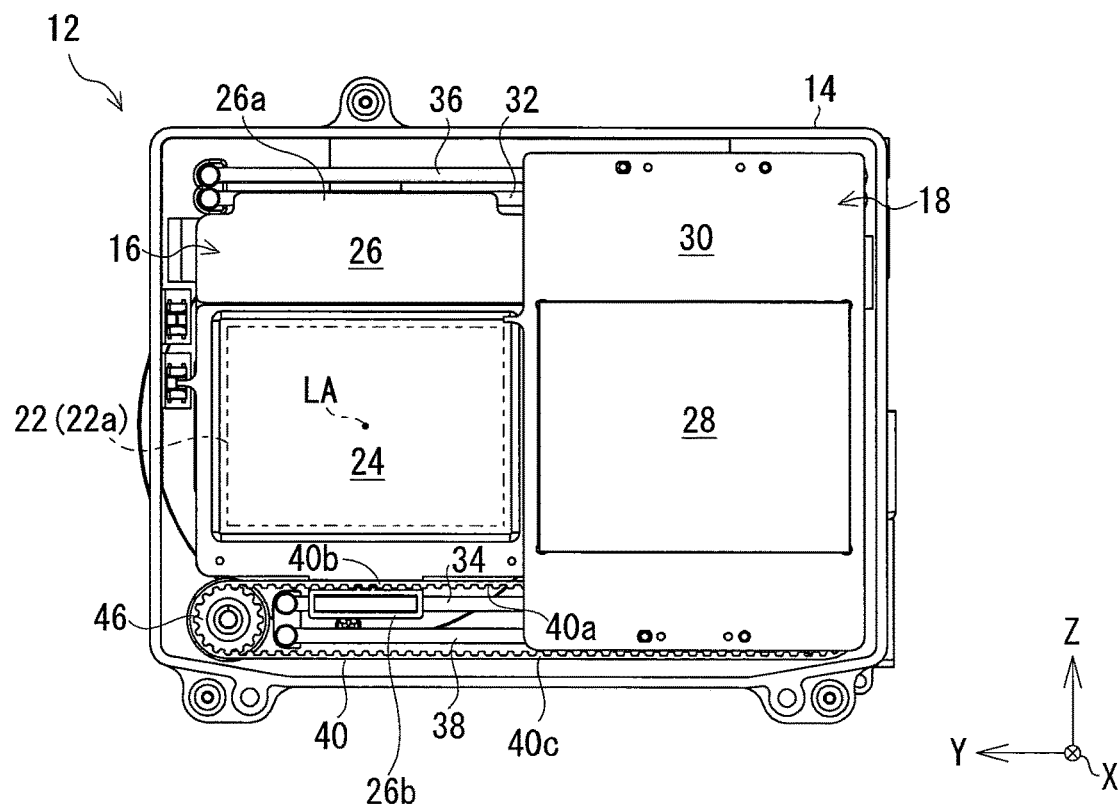
FIG. 4 is a rear view of the filter module.

FIG. 1 is a schematic front perspective view of an imaging apparatus according to a first embodiment of the present disclosure. In addition, FIG. 2 is a front perspective view of a filter module of the imaging apparatus according to the first embodiment. In addition, FIG. 3 is a rear perspective view of the filter module. Then, FIG. 4 is a rear view of the filter module. It should be noted that the X-Y-Z orthogonal coordinate system shown in the drawings is for facilitating understanding of embodiments of the present disclosure, and does not limit the embodiments of the present disclosure. The X-axis direction is a front-rear direction of the imaging apparatus, the Y-axis direction is a left-right direction, and the Z-axis direction is a height direction. It should be noted that the side where the subject is present at the time of photographing is defined as the front side of the imaging apparatus.

As shown in FIG. 1, the imaging apparatus 10 according to the first embodiment of the present disclosure is what is called a lens-interchangeable single-lens camera, and a filter module 12 is mounted on the imaging apparatus 10.

As shown in FIGS. 2 to 4, in the case of the present first embodiment, the filter module 12 includes a casing 14, a first filter unit 16, and a second filter unit 18.

The casing 14 is made of, for example, a metal material such as aluminum die casting, and supports the first and second filter units 16 and 18. In addition, in the case of the present embodiment, the casing 14 includes a lens attachment portion 14a to which a lens (not shown) is attached, and includes a protective glass 20 through which light from a subject transmits.

As shown in FIGS. 3 and 4, the imaging apparatus 10 includes an imaging element 22 having an imaging surface 22a, on which the light from the subject is incident, facing to the protective glass 20 in the extending direction of the optical axis LA of the imaging apparatus 10 (that is, the front-rear direction (X-axis direction) of the imaging apparatus 10) at an interval. The imaging element 22 is a photoelectric conversion device such as a CCD or a CMOS, and creates image data of a subject on the basis of light from the subject incident on the imaging surface 22a (an image of the subject) through the protective glass 20. It should be noted that the optical axis LA extends in the normal direction of the imaging surface 22a of the imaging element 22 and passes through the center of the rectangular imaging surface 22a.

In the case of the present first embodiment, as shown in FIGS. 3 and 4, the first filter unit 16 includes a first optical filter 24 and a frame-shaped first frame structure 26 that supports an outer peripheral portion of the first optical filter 24. In addition, the second filter unit 18 includes a second optical filter 28 and a second frame structure 30 that supports an outer peripheral portion of the second optical filter 28.

In the case of the present first embodiment, the first optical filter 24 is a filter that adjusts the light quantity of light incident on the imaging surface 22a of the imaging element 22, and is, for example, an electronic ND filter whose light transmittance can be changed. The ND filter is, for example, a liquid crystal filter. The light transmittance of the first optical filter 24 changes by changing the drive voltage applied to the first optical filter 24. It should be noted that the first optical filter 24 is not limited to the electronic ND filter, and may be another optical filter such as a non-electronic polarizing filter or an optical filter that transmits light of a specific wavelength. The second optical filter 28 is a filter whose light transmittance cannot be changed, that is, the light transmittance is fixed, and is made of, for example, transparent glass. It should be noted that the second optical filter 28 is not limited to a filter whose light transmittance is fixed, and only needs to be another optical filter different from the first optical filter 24. In the case of the present first embodiment, the first and second optical filters 24 and 28 have a rectangular shape similarly to the imaging surface 22a of the imaging element 22.

Figure 5:
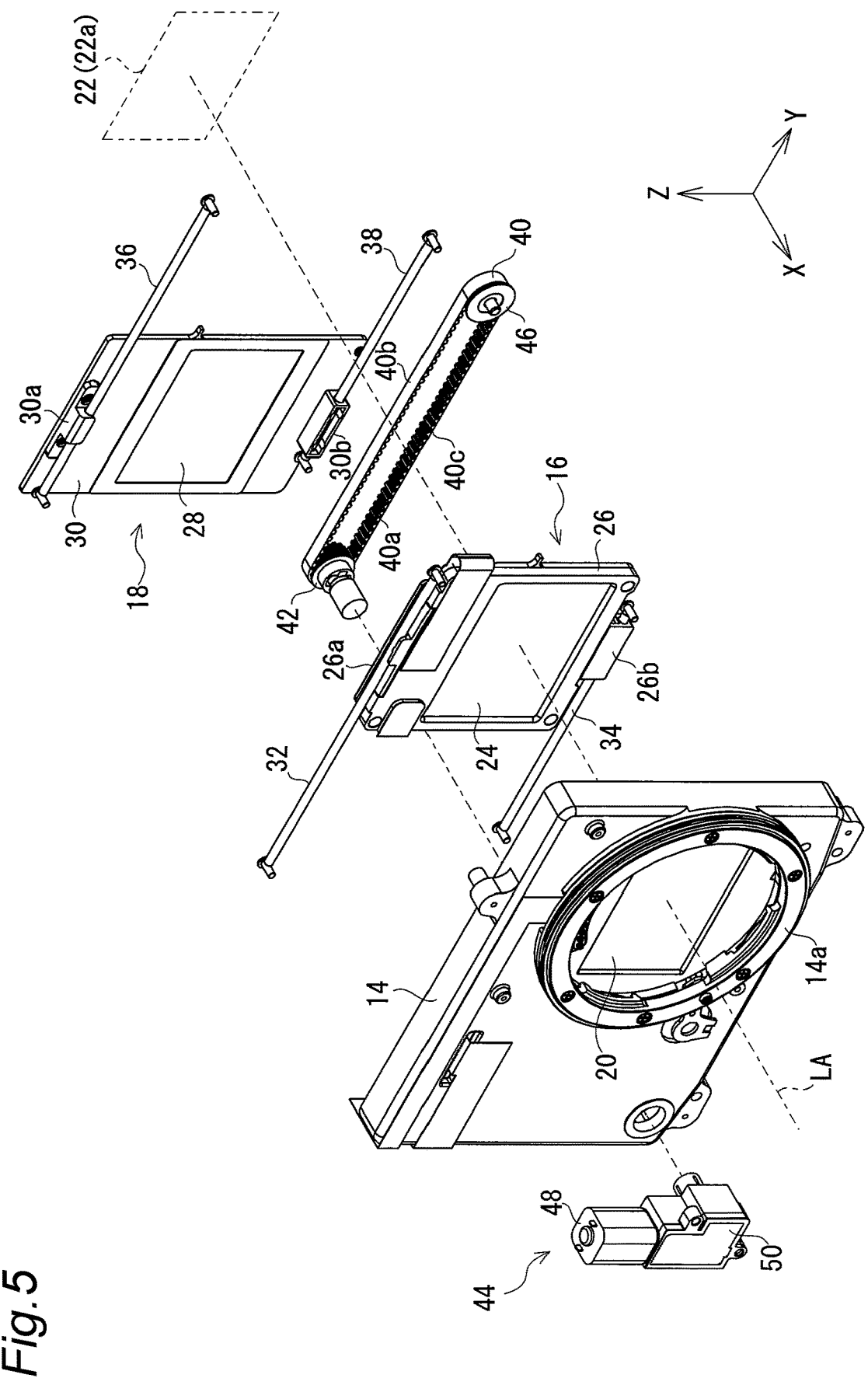
FIG. 5 is a front exploded perspective view of the filter module.

FIG. 5 is a front exploded perspective view of the filter module. In addition, FIG. 6 is a rear exploded perspective view of the filter module.

Figure 6:
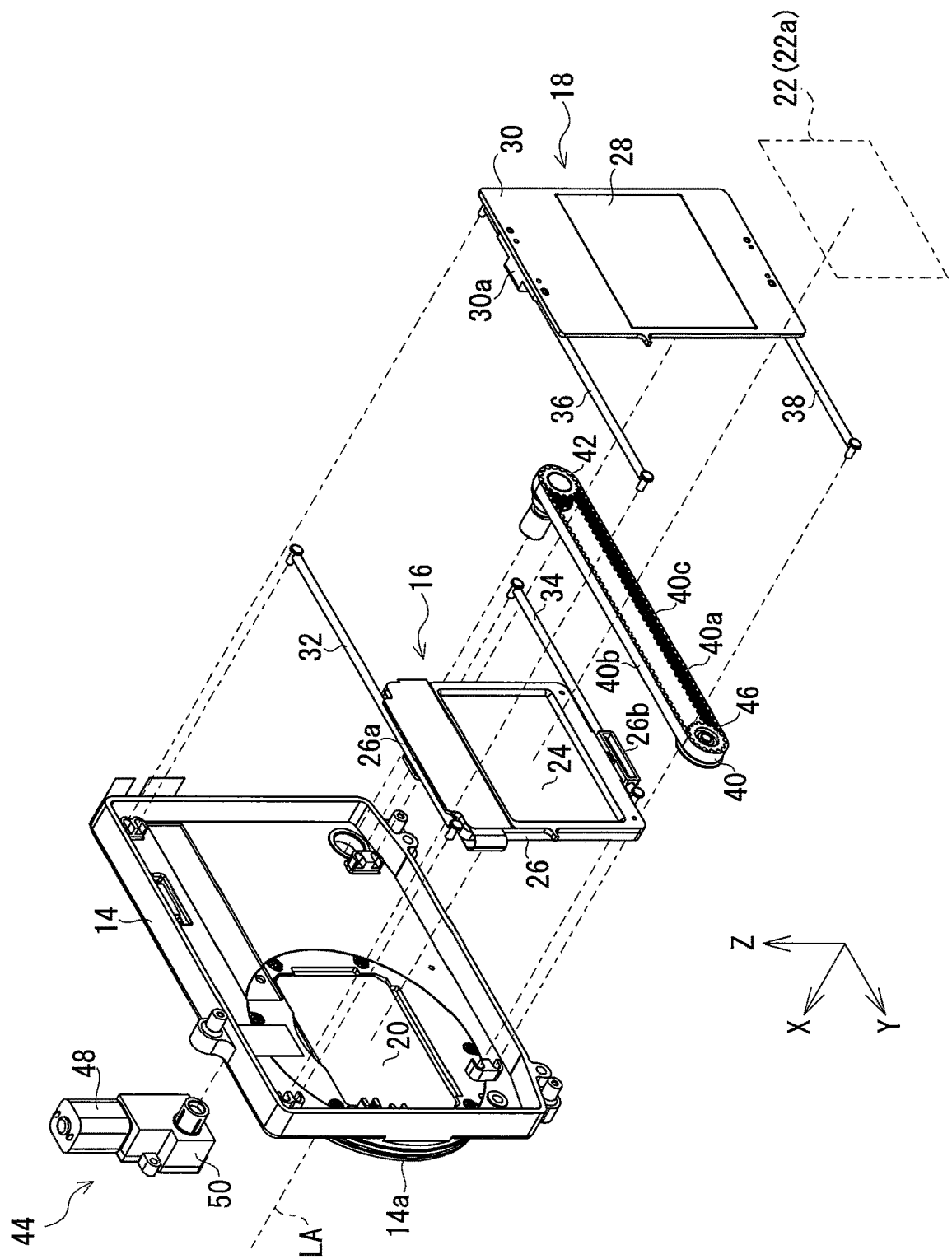
FIG. 6 is a rear exploded perspective view of the filter module.

As shown in FIGS. 4 to 6, each of the first and second filter units 16 and 18 is supported by the casing 14 of the filter module 12 so as to be movable in parallel in a direction intersecting the normal direction of the imaging surface 22a of the imaging element 22. In the case of the present first embodiment, each of the first and second filter units 16 and 18 moves in parallel in the left-right direction (Y-axis direction) of the imaging apparatus 10.

In the case of the present first embodiment, the first frame structure 26 of the first filter unit 16 is supported by the first upper side guide rail 32 and the first lower side guide rail 34 so as to be movable in parallel in the left-right direction (Y-axis direction) of the imaging apparatus 10. The first upper side guide rail 32 and the first lower side guide rail 34 have a pole shape, and are attached to the casing 14 so as to extend in the left-right direction of the imaging apparatus 10 and to be parallel to each other. An upper side slider portion 26a movable in the left-right direction of the imaging apparatus 10 in a state of holding the first upper side guide rail 32 is provided in the upper portion of the first frame structure 26. In addition, a lower side slider portion 26b movable in the left-right direction of the imaging apparatus 10 in a state of holding the first lower side guide rail 34 is provided in the lower portion of the first frame structure 26.

The second frame structure 30 of the second filter unit 18 is supported by the second upper side guide rail 36 and the second lower side guide rail 38 so as to be movable in parallel in the left-right direction (Y-axis direction) of the imaging apparatus 10. The second upper side guide rail 36 and the second lower side guide rail 38 have a pole shape, and are attached to the casing 14 so as to extend in the left-right direction of the imaging apparatus 10 and to be parallel to each other. An upper side slider portion 30a movable in the left-right direction of the imaging apparatus 10 in a state of holding the second upper side guide rail 36 is provided in the upper portion of the second frame structure 30. In addition, a lower side slider portion 30b movable in the left-right direction of the imaging apparatus 10 in a state of holding the second lower side guide rail 38 is provided in the lower portion of the second frame structure 30.

In the case of the present first embodiment, the first frame structure 26 of the first filter unit 16 moves in parallel in the left-right direction (Y-axis direction) of the imaging apparatus 10 at a position in front of the second frame structure 30 of the second filter unit 18. That is, the first frame structure 26 and the second frame structure 30 are different in position in the front-rear direction (X-axis direction) of the imaging apparatus 10.

It should be noted that guide members that guide the first frame structure 26 and the second frame structure 30 so as to be movable in parallel in the left-right direction (Y-axis direction) of the imaging apparatus 10 are not limited to the guide rails 32 to 38. For example, the first frame structure 26 and the second frame structure 30 may be guided so as to be movable in parallel in the left-right direction of the imaging apparatus 10 by a guide groove formed in the casing 14 and extending in the left-right direction of the imaging apparatus 10.

The imaging apparatus 10 includes a drive mechanism that moves each of the first filter unit 16 and the second filter unit 18 in parallel in a direction (the left-right direction (Y-axis direction) of the imaging apparatus 10 in the case of the present first embodiment) intersecting the normal direction of the imaging surface 22a of the imaging element 22.

The drive mechanism includes a belt member 40, a belt drive member 42 that rotates with the belt member 40 partially wound, and a power source 44 that rotationally drives the belt drive member 42.

In the case of the present first embodiment, the belt member 40 is made of a flexible member and has an endless shape. In addition, the belt member 40 includes internal teeth 40a. The drive mechanism includes a belt support member 46 that freely rotates with the belt member 40 partially wound. In the case of the present first embodiment, the belt drive member 42 and the belt support member 46 are gears including external teeth to be engaged with the internal teeth 40a of the belt member 40. In addition, the belt drive member 42 and the belt support member 46 are arranged at an interval in the left-right direction (Y-axis direction) of the imaging apparatus 10, and are supported by the casing 14 rotatably around a rotation center line extending in the front-rear direction (X-axis direction) of the imaging apparatus 10.

In the case of the present first embodiment, the power source 44 that rotationally drives the belt drive member 42 includes a motor 48 and a drive coupling mechanism 50 such as a speed reduction mechanism that couples the motor 48 and the belt drive member 42. In the case of the present first embodiment, the power source 44 is disposed in the grip portion 10a of the imaging apparatus 10 protruding forward shown in FIG. 1. Accordingly, the power source 44 can be provided in the imaging apparatus 10 without impairing the design properties of the imaging apparatus 10, that is, the design properties of the lens-interchangeable single-lens camera.

The first frame structure 26 of the first filter unit 16 and the second frame structure 30 of the second filter unit 18 are coupled to the belt member 40 of the drive mechanism.

Figure 7:
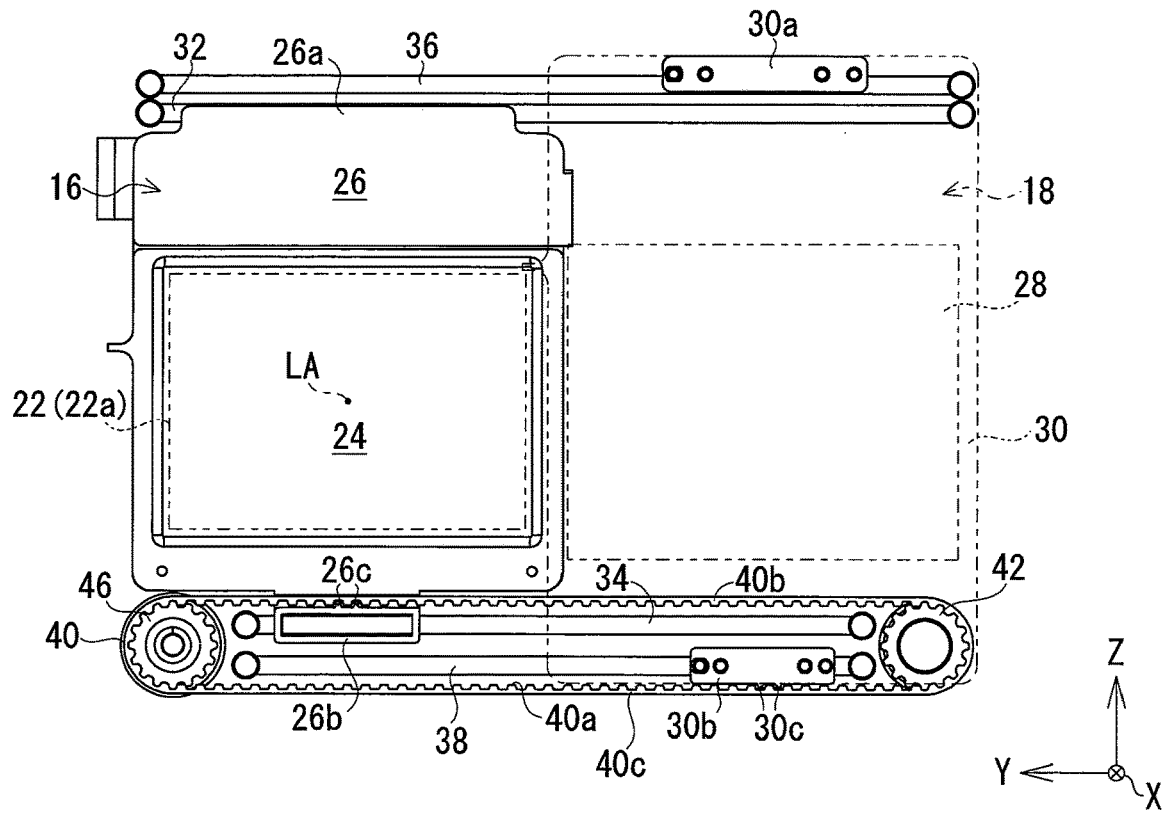
FIG. 7 is a diagram showing coupling between the first and second filter units and the belt member of the drive mechanism.

FIG. 7 shows coupling between the first and second filter units and the belt member of the drive mechanism.

As shown in FIG. 7, the belt member 40 is wound around each of the belt drive member 42 and the belt support member 46 arranged at an interval in the left-right direction (Y-axis direction) of the imaging apparatus 10. Accordingly, the belt member 40 includes, between the belt drive member 42 and the belt support member 46, a linear first portion 40b and a second portion 40c which linearly extend in the left-right direction of the imaging apparatus 10 and are parallel to each other. The first frame structure 26 of the first filter unit 16 is coupled to the first portion 40b of the belt member 40 through its lower side slider portion 26b. The second frame structure 30 of the second filter unit 18 is coupled to the second portion 40c of the belt member 40 through its lower side slider portion 30b. In the case of the present first embodiment, the lower side slider portion 26b of the first frame structure 26 and the lower side slider portion 30b of the second frame structure 30 are formed with engaging teeth 26c and 30c to be engaged with the internal teeth 40a of the belt member 40.

According to the coupling between the first and second filter units 16 and 18 and the belt member 40 of the drive mechanism, when the first filter unit 16 moves in parallel in the left direction or the right direction, the second filter unit 18 moves in parallel in the opposite direction.

Specifically, for example, when the user executes a predetermined operation on a predetermined operation unit (not shown) provided on the rear surface of the imaging apparatus 10, the motor 48 of the power source 44 rotationally drives the belt drive member 42 through the drive coupling mechanism 50. With this, the first portion 40b of the belt member 40 moves in the left direction or the right direction, and together therewith, the second portion 40c moves in the opposite direction. As a result, the first filter unit 16 coupled to the first portion 40b of the belt member 40 is guided by the first upper side guide rail 32 and the first lower side guide rail 34 to move in parallel leftward or rightward. Together therewith, the second filter unit 18 coupled to the second portion 40c of the belt member 40 is guided by the second upper side guide rail 36 and the second lower side guide rail 38 to move in parallel in a direction opposite to the moving direction of the first filter unit 16.

It should be noted that in the case of the present first embodiment, the first lower side guide rail 34 and the second lower side guide rail 38 are disposed in a space surrounded by the endless-shaped belt member 40. As described above, by effectively using the space surrounded by the endless-shaped belt member 40, the filter module 12 can be reduced in size as compared with a case where the first lower side guide rail 34 and the second lower side guide rail 38 are disposed in a place other than this space. As a result, the imaging apparatus 10 can be reduced in size.

The belt member 40 of this drive mechanism causes the first filter unit 16 to move in parallel between the first filtering position and the first retraction position.

As shown in FIGS. 3 and 4, the first filter unit 16 is moved in parallel by the belt member 40 of the drive mechanism and disposed in the first filtering position. Specifically, when the first filter unit 16 is positioned in the first filtering position, the first optical filter 24 is present in front of the imaging surface 22a of the imaging element 22. With this, light from the subject transmitting through the protective glass 20 and before reaching the imaging surface 22a transmits through the first optical filter 24. As a result, the light from the subject subjected to filter processing by the first optical filter 24 is incident on the imaging surface 22a.

In addition, the first filter unit 16 is moved in parallel by the belt member 40 of the drive mechanism and is disposed at the first retraction position.

Figure 8:
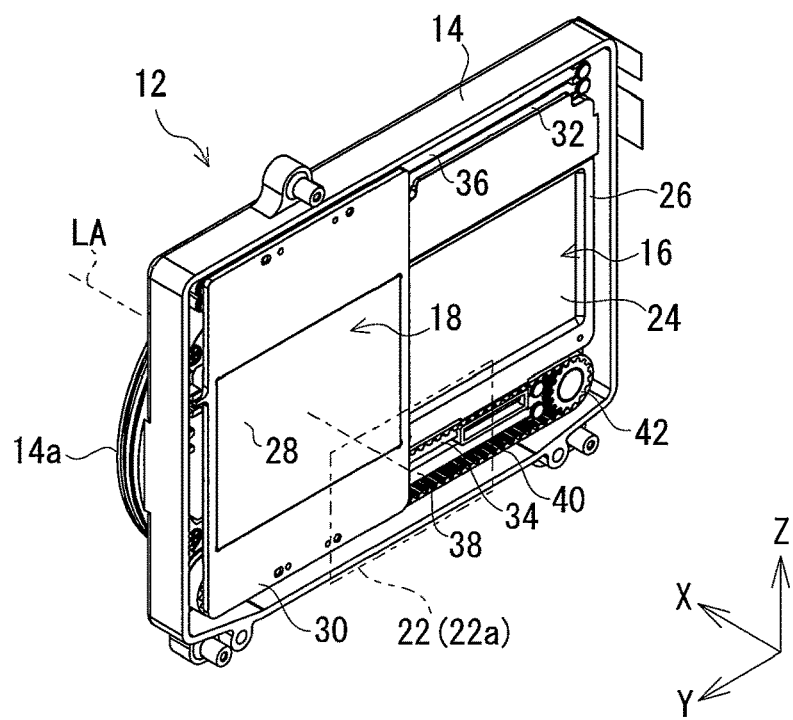
FIG. 8 is a rear perspective view of the filter module in a state where the first filter unit is positioned at the first retraction position.

FIG. 8 is a rear perspective view of the filter module in a state where the first filter unit is positioned at the first retraction position.

As shown in FIG. 8, the first filter unit 16 retracts to a position deviated from the front of the imaging surface 22a of the imaging element 22 as the first retraction position. In the case of the present first embodiment, the first filter unit 16 retracts from the front of the imaging surface 22a to the left (when viewed from the front of the imaging apparatus 10). Accordingly, light from the subject is incident on the imaging surface 22a without being obstructed by the first filter unit 16, that is, without transmitting through the first optical filter 24. Similarly, as shown in FIG. 8, the second filter unit 18 is moved in parallel by the belt member 40 of the drive mechanism and disposed in the second filtering position. Specifically, when the second filter unit 18 is positioned in the second filtering position, the second optical filter 28 is present in front of the imaging surface 22a of the imaging element 22. Light from the subject transmitting through the protective glass 20 and before reaching the imaging surface 22a transmits through the second optical filter 28. As a result, the light from the subject subjected to filter processing by the second optical filter 28 is incident on the imaging surface 22a. It should be noted that the second filtering position is positioned behind the first filtering position.

In addition, as shown in FIGS. 3 and 4, the second filter unit 18 is moved in parallel by the belt member 40 of the drive mechanism and disposed in the second retraction position. Specifically, the second filter unit 18 retracts to a position deviated from the front of the imaging surface 22a of the imaging element 22 as the second retraction position. In the case of the present embodiment, the second filter unit 18 retracts from the front of the imaging surface 22a to the left (when viewed from the front of the imaging apparatus 10). Accordingly, light from the subject is incident on the imaging surface 22a without being obstructed by the second filter unit 18, that is, without transmitting through the second optical filter 28. It should be noted the second retraction position is positioned behind the first retraction position.

As shown in FIG. 4, when the first filter unit 16 is positioned at the first filtering position, the second filter unit 18 is positioned at the second retraction position. In addition, as shown in FIG. 8, when the first filter unit 16 is positioned at the first retraction position, the second filter unit 18 is positioned at the second filtering position. That is, the first filter unit 16 and the second filter unit 18 are interchanged with each other in the front-rear direction (as viewed in the X-axis direction) of the imaging apparatus 10. Then, one of the first optical filter 24 of the first filter unit 16 and the second optical filter 28 of the second filter unit 18 is selectively arranged in front of the imaging element 22.

As described above, the first filter unit 16 and the second filter unit 18 are interchanged with each other in the front-rear direction (as viewed in the X-axis direction) of the imaging apparatus 10, whereby it is not necessary to provide the respective retraction spaces of the first and second filter units 16 and 18 on both sides of the imaging element 22. As a result, an increase in size of the imaging apparatus 10 is suppressed as compared with a case where retraction spaces are provided on both sides of the imaging element 22.

For example, every time the user performs a predetermined operation on a predetermined operation unit provided on the rear surface of the imaging apparatus 10, the first filter unit 16 and the second filter unit 18 are interchanged with each other. As a result, the optical filter positioned in front of the imaging element 22 is switched from the first optical filter 24 to the second optical filter 28 or vice versa.

The reason of moving the first and second filter units 16 and 18 selectively arranged in front of the imaging element 22 as described above in parallel in directions opposite to each other by the belt member 40 will be described with reference to a comparative example.

Figure 9A:
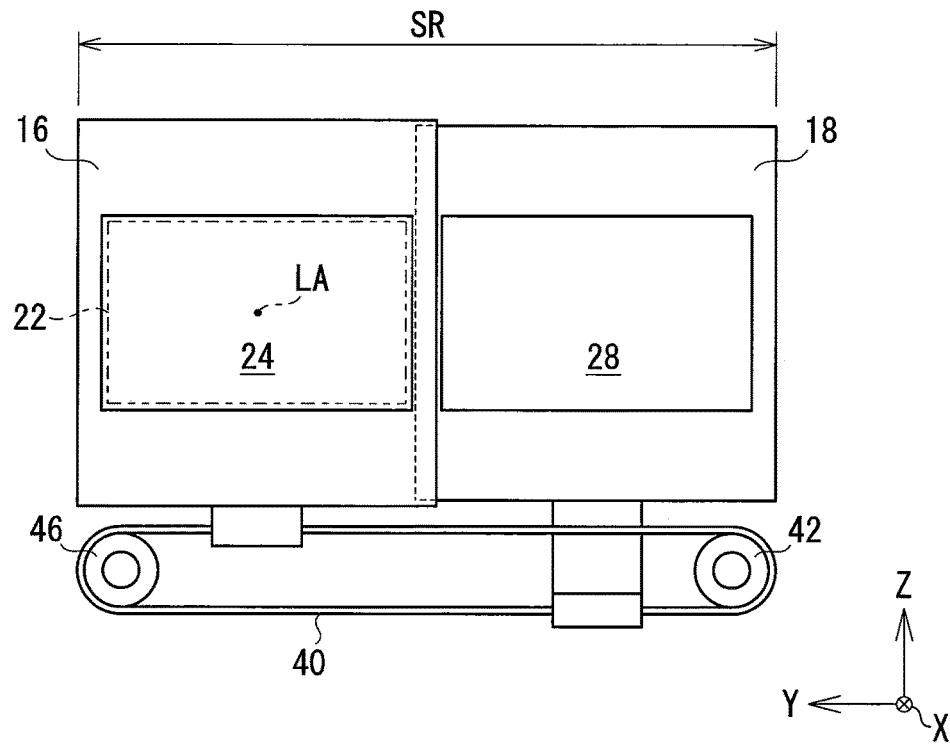
FIG. 9A is a schematic diagram showing a drive mechanism of an example in which the first and second filter units are moved in parallel in directions opposite to each other, and showing a state in which the first filter unit is positioned at a first filtering position.
Figure 9B:
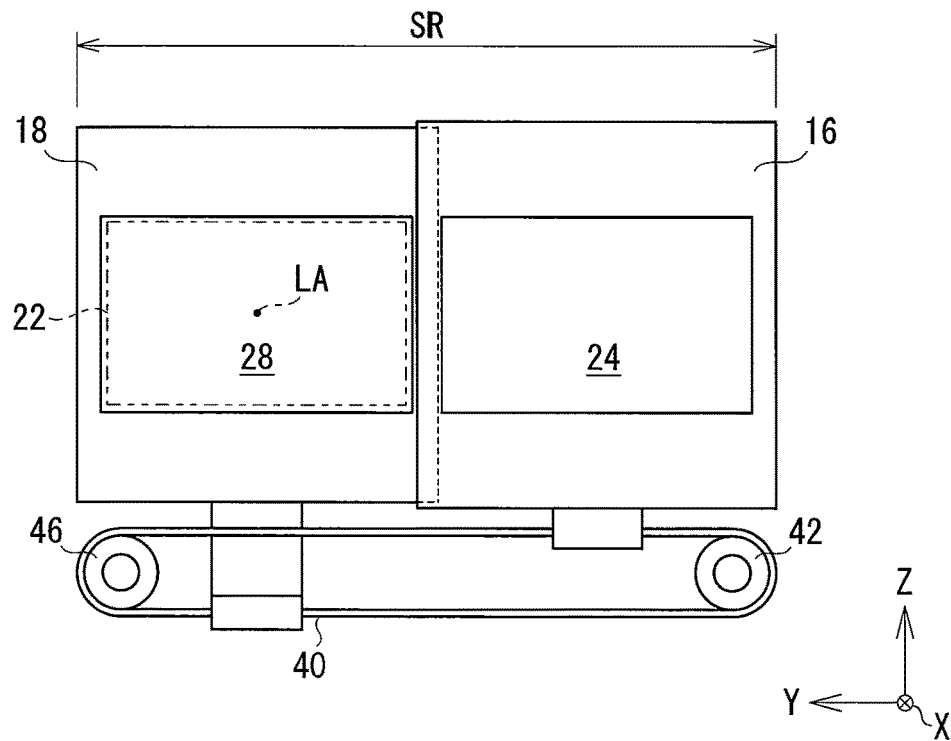
FIG. 9B is a schematic diagram showing a drive mechanism of an example in which the first and second filter units are moved in parallel in directions opposite to each other, and showing a state in which the first filter unit is positioned at a first retraction position.

FIGS. 9A and 9B are schematic diagrams of a drive mechanism in an example in which the first and second filter units are moved in parallel in directions opposite to each other. FIG. 9A shows a state in which the first filter unit 16 is positioned at the first filtering position (that is, a state in which the first optical filter 24 is disposed in front of the imaging element 22). In addition, FIG. 9B shows a state in which the first filter unit 16 is positioned at the first retraction position (that is, a state in which the first optical filter 24 is disposed at a position deviated from the front of the imaging element 22).

Figure 10A:
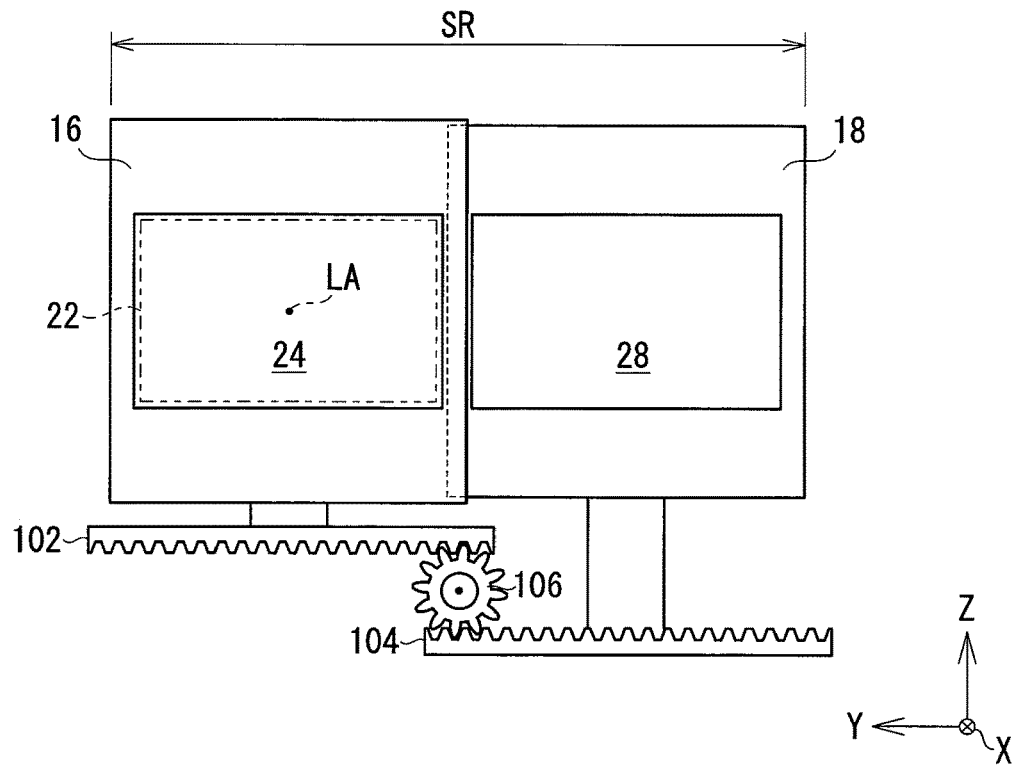
FIG. 10A is a schematic diagram showing a drive mechanism of a comparative example in which the first and second filter units are moved in parallel in directions opposite to each other, and showing a state in which the first filter unit is positioned at a first filtering position.
Figure 10B:
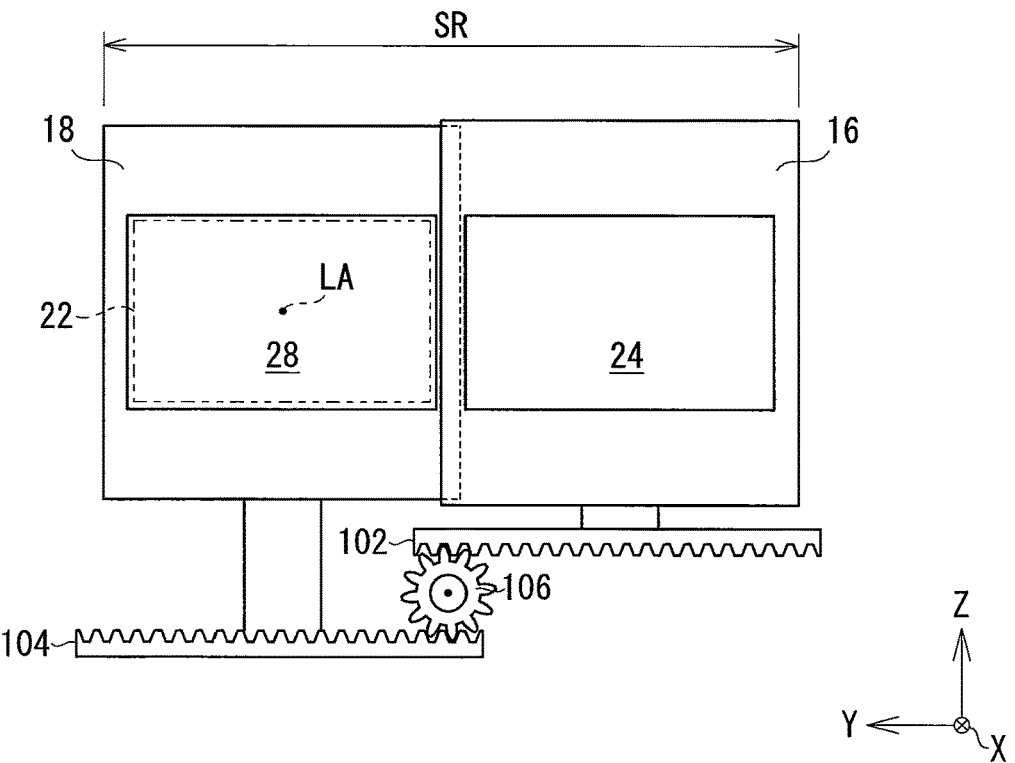
FIG. 10B is a schematic diagram showing a drive mechanism of a comparative example in which the first and second filter units are moved in parallel in directions opposite to each other, and showing a state in which the first filter unit is positioned at a first retraction position.

FIGS. 10A and 10B are schematic diagrams of a drive mechanism in a comparative example in which the first and second filter units are moved in parallel in directions opposite to each other. FIG. 10A shows a state in which the first filter unit 16 is positioned at the first filtering position (that is, a state in which the first optical filter 24 is disposed in front of the imaging element 22). In addition, FIG. 10B shows a state in which the first filter unit 18 is positioned at the first retraction position (that is, a state in which the first optical filter 24 is disposed at a position deviated from the front of the imaging element 22).

As shown in FIGS. 9A, 9B, 10A, and 10B, the first and second filter units 16 and 18 move in parallel within a predetermined movement range SR in the left-right direction (Y-axis direction) of the imaging apparatus 10.

In the case of the example shown in FIGS. 9A and 9B, the drive mechanism that moves the respective first and second filter units 16 and 18 in parallel in directions opposite to each other can be arranged without protruding to the outside from the predetermined movement range SR of the first and second filter units 16 and 18. That is, each of the endless-shaped belt member 40, the belt drive member 42, and the belt support member 46 can be arranged so as to fall within the predetermined movement range SR of the first and second filter units 16 and 18. Accordingly, an increase in size of the filter module 12, particularly, an increase in size in the left-right direction (Y-axis direction) of the imaging apparatus 10 is suppressed.

As shown in FIGS. 10A and 10B, the drive mechanism of the comparative example has what is called a rack and pinion structure, and includes first and second racks 102 and 104 respectively provided in the first and second filter units 16 and 18, and a pinion gear 106 to be engaged with the racks 102 and 104.

The first and second racks 102 and 104 are supported by the casing of the filter module movably in the left-right direction (Y-axis direction) of the imaging apparatus.

The pinion gear 106 is supported by the casing of the filter module rotatably around a rotation center line extending in the front-rear direction (X-axis direction) of the imaging apparatus. In addition, the pinion gear 106 is provided at a position in the left-right direction (Y-axis direction) of the imaging apparatus corresponding to the center of the predetermined movement range SR of the first and second filter units 16 and 18. The first rack 102 engages with the pinion gear 106 from above, and the second rack 104 engages with the pinion gear 106 from below.

The drive mechanism of the comparative example of the rack and pinion structure shown in FIGS. 10A and 10B can move the first and second filter units 16 and 18 in parallel in directions opposite to each other, similarly to the drive mechanism of the example shown in FIGS. 9A and 9B. However, as shown in FIGS. 10A and 10B, the first and second racks 102 and 104 cannot fall within the predetermined movement range SR of the first and second filter units 16 and 18 in their entirety. That is, some of the first and second racks 102 and 104 protrudes in the left-right direction (Y-axis direction) of the imaging apparatus from the predetermined movement range SR. This is because when the first filter unit 16 is positioned in the first filtering position and the second filter unit 18 is positioned in the second retraction position, or when the first filter unit 16 is positioned in the first retraction position and the second filter unit 18 is positioned in the second filtering position, each of the first and second racks 102 and 104 needs to be reliably engaged with the pinion gear 106. As a result, the filter module of the comparative example increases in size in the left-right direction of the imaging apparatus (as compared with the example using the belt member 40 shown in FIGS. 9A and 9B).

In addition, as shown in FIGS. 10A and 10B, when the pinion gear 106 is provided at the center of the predetermined movement range SR of the first and second filter units 16 and 18, it may be difficult to provide a power source for rotationally driving the pinion gear 106 in the imaging apparatus. For example, when the imaging apparatus is what is called a lens-interchangeable single-lens camera as shown in FIG. 1, the lens attachment portion and the power source, of the imaging apparatus, may interfere with each other. In order to avoid the interference, it is necessary to enlarge the imaging apparatus in the height direction so that the lens attachment portion and the power source do not overlap each other in the front-rear direction. As a result, the imaging apparatus increases in size in the height direction.

On the other hand, as shown in FIGS. 9A and 9B, the belt drive member 42 is provided at a position deviated from the center of the predetermined movement range SR of the first and second filter units 16 and 18. Accordingly, as shown in FIG. 3, the power source 44 that rotationally drives the belt drive member 42 can be disposed at a position away from the lens attachment portion 14b. As a result, the power source 44 can be disposed in the grip portion 10a of the imaging apparatus 10 shown in FIG. 1.

According to the present first embodiment as described above, the optical filter can be selectively disposed in front of the imaging surface of the imaging element without increasing the size of the imaging apparatus.

Second Embodiment

The present second embodiment is different from the first embodiment described above in that power sources of a drive mechanism that moves the first and second filter units in parallel in directions opposite to each other are different. Therefore, the present second embodiment will be described focusing on this different point. It should be noted that components of the present second embodiment substantially the same as the components of the first embodiment described above are denoted by the same reference numerals.

Figure 11:
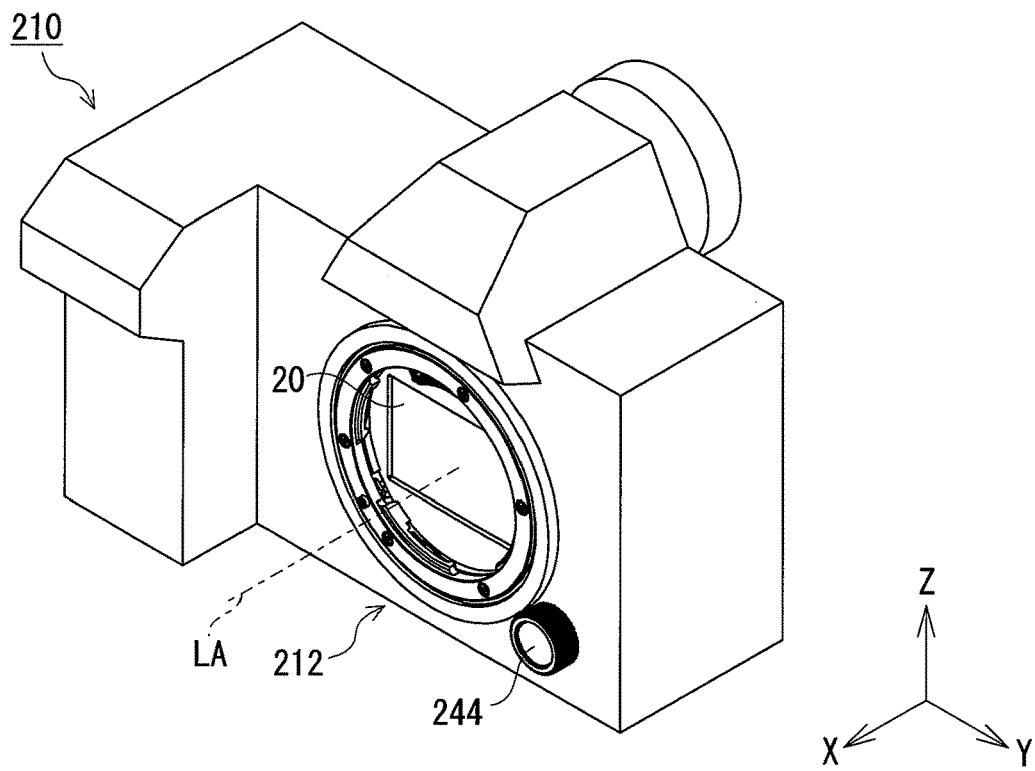
FIG. 11 is a schematic front perspective view of an imaging apparatus according to a second embodiment of the present disclosure.
Figure 12:
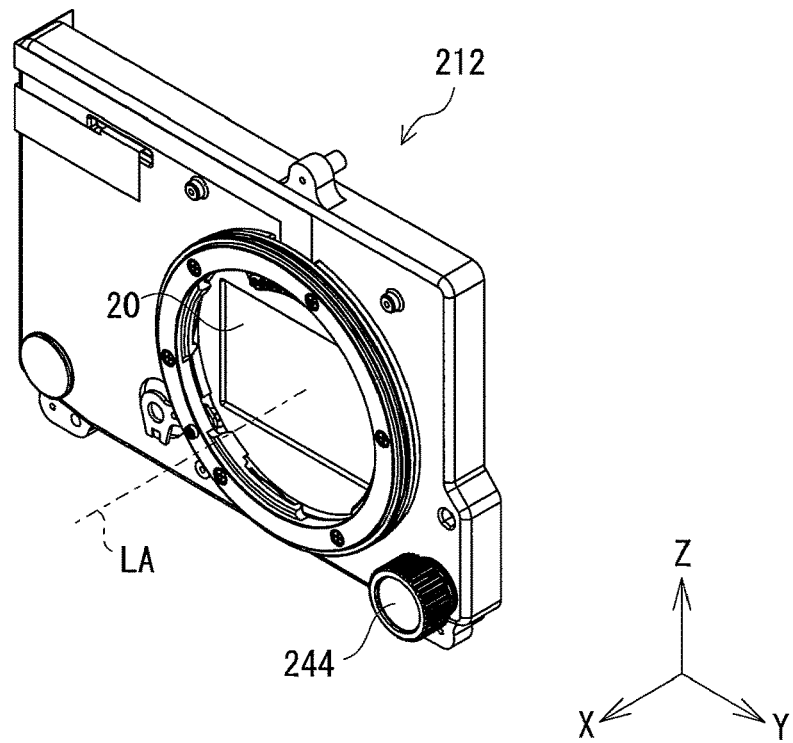
FIG. 12 is a front perspective view of a filter module of the imaging apparatus according to the second embodiment.
Figure 13:
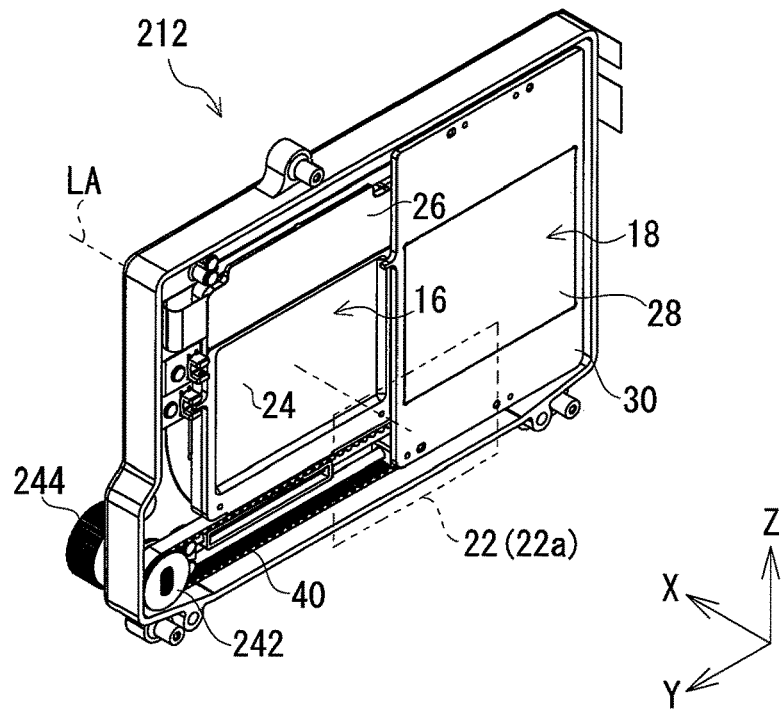
FIG. 13 is a rear perspective view of the filter module in a state where the first filter unit is positioned at the first filtering position.

FIG. 11 is a schematic front perspective view of an imaging apparatus according to the second embodiment of the present disclosure. In addition, FIG. 12 is a front perspective view of a filter module of the imaging apparatus according to the second embodiment. Furthermore, FIG. 13 is a rear perspective view of the filter module in a state where the first filter unit is positioned at the first filtering position. Then, FIG. 14 is a rear perspective view of the filter module in a state where the first filter unit is positioned at the first retraction position.

Figure 14:
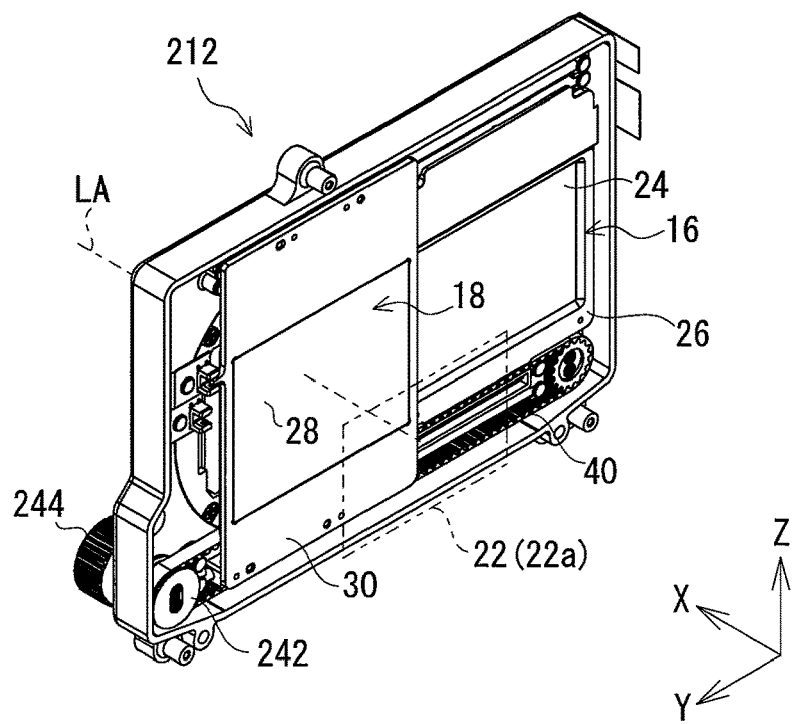
FIG. 14 is a rear perspective view of the filter module in a state where the first filter unit is positioned at the first retraction position.

As shown in FIGS. 11 to 14, the drive mechanism that moves the respective first and second filter units 16 and 18 in parallel in directions opposite to each other, and in the left-right direction (Y-axis direction) of the imaging apparatus 210 is a manual type, unlike that of the above-described first embodiment. Specifically, the drive mechanism according to the present second embodiment includes a dial 244 coupled to the belt drive member 242 and to be rotated by the user as a power source for rotationally driving the belt drive member 242. As shown in FIG. 11, the dial 244 is provided on the front surface of the imaging apparatus 210. The user rotates the dial 244 forward or backward, whereby the first filter unit 16 is disposed in the first filtering position (that is, the position in front of the imaging element 22) as shown in FIG. 13, or the first filter unit 16 is disposed in the first retraction position (that is, the position deviated from the front of the imaging element 22) as shown in FIG. 14, through the belt member 40 and the belt drive member 242.

Also in the present second embodiment, similarly to the first embodiment described above, the optical filter can be selectively arranged in front of the imaging surface of the imaging element without increasing the size of the imaging apparatus.

As described above, although the embodiments of the present disclosure have been described by exemplifying the above-described embodiments, the embodiments of the present disclosure are not limited to the above-described embodiments.

For example, in the case of the above-described embodiments, as shown in FIG. 3, the imaging apparatus 10 includes a second optical filter 28 that is made of glass or the like whose light transmittance cannot be changed. In addition, the second optical filter 28 has an optical path length substantially the same as the optical path length of first optical filter 24. Accordingly, even when the first optical filter 24 is changed to the second optical filter 28, it is possible to maintain a state in focus. However, the embodiments of the present disclosure are not limited thereto. When a state in focus can be maintained by another mechanism even when the first optical filter 24 is retracted from the first filtering position (position in front of the imaging surface 22a of the imaging element 22), the second optical filter 28, that is, the second filter unit 18 can be omitted. For example, instead of the second filter unit 18, a mechanism for shifting the imaging element 22 in the front-rear direction (X-axis direction) of the imaging apparatus 10 to perform focusing is provided in the imaging apparatus 10.

That is, in a broad sense, an imaging apparatus according to an embodiment of the present disclosure includes: an imaging element including an imaging surface on which light from a subject is incident; a first filter unit including a first optical filter; and a drive mechanism configured to move the first filter unit in parallel in a second direction intersecting a first direction being a normal direction of the imaging surface and between a first filtering position and a first retraction position. The first filtering position is a position at which the first optical filter is present in front of the imaging surface of the imaging element. The first retraction position is a position at which the first optical filter is deviated from a front of the imaging surface. The drive mechanism includes a belt member coupled to the first filter unit, and a belt drive member configured to rotate in a state where the belt member is partially wound, the belt drive member configured to move a first portion of the belt member to which the first filter unit is coupled in the second direction.

As described above, the above-described embodiments have been described as the exemplification of the technique in the present disclosure. To that end, drawings and a detailed description are provided. Therefore, among the components described in the drawings and the detailed description, not only the components essential for solving the problem, but also the components not essential for solving the problem may be included in order to exemplify the above technique. Therefore, it should not be recognized that these non-essential components are essential immediately because these non-essential components are described in the drawings and the detailed description.

In addition, since the above embodiments are for exemplifying the technique in the present disclosure, various changes, substitutions, additions, omissions, and the like can be made within the scope of the claims or the equivalent thereof.

The present disclosure is applicable to an imaging apparatus including a plurality of ND filters having different light transmittance.

What is claimed is:

1. An imaging apparatus comprising:
an imaging element including an imaging surface on which light from a subject is incident;
a first filter unit including a first optical filter;
a second filter unit including a second optical filter; and
a drive mechanism configured to move the first filter unit in parallel in a second direction intersecting a first direction being a normal direction of the imaging surface and between a first filtering position and a first retraction position, while moving the second filter unit in parallel in the second direction at a position in the first direction different from the first filter unit and between a second filtering position and a second retraction position,
wherein the first filtering position is a position at which the first optical filter is present in front of the imaging surface of the imaging element,
wherein the second filtering position is a position at which the second optical filter is present in front of the imaging surface,
wherein the first retraction position is a position at which the first optical filter is deviated from a front of the imaging surface,
wherein the second retraction position is a position at which the second optical filter is deviated from a front of the imaging surface,
wherein the drive mechanism includes
a belt member including a first portion and a second portion each linearly extending in the second direction and spaced apart parallel to each other the first portion being coupled to the first filter unit and the second portion being coupled to the second filter unit, and
a belt drive member configured to rotate in a state where the belt member is partially wound, the belt drive member rotating to move the first portion of the belt member to which the first filter unit is coupled in the second direction while simultaneously moving the second portion of the belt member to which the second filter unit is coupled in the second direction, the first portion and the second portion moving in opposite directions,
wherein, by rotation of the belt drive member, the first filter unit is moved from the first retraction position to the first filtering position while the second filter unit is moved simultaneously in an opposite moving direction from the second filtering position to the second retraction position, and
wherein, by rotation of the belt drive member, the first filter unit is moved from the first filtering position to the first retraction position while the second filter unit is moved simultaneously in an opposite moving direction from the second retraction position to the second filtering position.

2. The imaging apparatus according to claim 1, wherein the belt member and the belt drive member are disposed within a movement range in the second direction of the first and second filter units.

3. The imaging apparatus according to claim 1, further comprising a first guide member and a second guide member configured to respectively guide the first filter unit and the second filter unit so that the first filter unit and the second filter unit move in parallel in the second direction,
wherein the first guide member and the second guide member are disposed in a space surrounded by the belt member.

4. The imaging apparatus according to claim 1,
wherein the first optical filter is an electronic ND filter whose light transmittance is changeable,
wherein the second optical filter is made of transparent glass, and
wherein the second optical filter has an optical path length identical to an optical path length of the first optical filter.

5. The imaging apparatus according to claim 1, wherein the drive mechanism includes a motor coupled to the belt drive member as a power source for rotationally driving the belt drive member.

6. The imaging apparatus according to claim 5, wherein the motor is disposed in a grip portion of the imaging apparatus.

7. The imaging apparatus according to claim 1, wherein the drive mechanism includes a dial coupled to the belt drive member and operated by a user as a power source for rotationally driving the belt drive member.

* * * * *